United States Patent [19]

Berry et al.

[11] Patent Number: 5,537,630
[45] Date of Patent: Jul. 16, 1996

[54] METHOD AND SYSTEM FOR SPECIFYING METHOD PARAMETERS IN A VISUAL PROGRAMMING SYSTEM

[75] Inventors: Richard E. Berry, Georgetown; Bruce A. Tate, Austin, both of Tex.

[73] Assignee: International Business Machines Corporation, Armonk, N.Y.

[21] Appl. No.: 349,284

[22] Filed: Dec. 5, 1994

[51] Int. Cl.⁶ .................................................. G06F 3/00
[52] U.S. Cl. ........................ 395/155; 395/156; 395/159
[58] Field of Search ............................. 395/155–161, 395/650, 700; 364/280–280.1, 280.4, 280.5, 280.7, 267–267.8; 345/156, 902

[56] References Cited

U.S. PATENT DOCUMENTS

| | | | |
|---|---|---|---|
| 4,829,423 | 5/1989 | Tennant et al. | 364/200 |
| 4,831,524 | 5/1989 | Furgerson | 364/300 |
| 4,914,568 | 4/1990 | Kodosky et al. | 395/159 X |
| 5,070,534 | 12/1991 | Lascelles et al. | 395/156 |
| 5,206,950 | 4/1993 | Geary et al. | 395/600 |
| 5,208,910 | 5/1993 | Higgins et al. | 395/156 |
| 5,237,654 | 8/1993 | Shackelford et al. | 395/160 |
| 5,237,691 | 8/1993 | Robinson et al. | 395/700 |
| 5,261,042 | 11/1993 | Brandt | 395/156 |
| 5,293,476 | 3/1994 | Wolber et al. | 395/159 |
| 5,313,574 | 5/1994 | Belthe | 395/159 |
| 5,327,529 | 7/1994 | Fults et al. | 395/155 |
| 5,377,318 | 12/1994 | Wolber | 395/159 |
| 5,432,903 | 7/1995 | Frid-Nielsen | 395/161 |
| 5,450,540 | 9/1995 | Spohrer et al. | 395/155 |

Primary Examiner—Mark R. Powell
Assistant Examiner—John E. Breene
Attorney, Agent, or Firm—Jeffrey S. LaBaw; Duke W. Yee; Andrew J. Dillon

[57] ABSTRACT

A method and data processing system for efficiently creating a program in an object oriented environment using a graphic user interface. An object is graphically displayed within the graphic user interface, wherein the object includes a method written in an object-oriented language. The method has a number of parameters. Each parameter is graphically displayed in the graphic user interface. Such display may be in response to a selection of the graphically displayed object. Each parameter is visually associated with the graphically displayed object. A list of selections is displayed for a parameter in the plurality of parameters in response to a selection of the parameter. Specification of the parameter using the list of selections by the user is permitted, wherein the parameter is specified using the list of selections is propagated to the method in the object oriented language used to create the object. A tree structure may be used to display associations between the parameters and displayed objects.

25 Claims, 11 Drawing Sheets

METHOD AND SYSTEM FOR SPECIFYING METHOD PARAMETERS IN A VISUAL PROGRAMMING SYSTEM

BACKGROUND OF THE INVENTION

1. Technical Field

The present invention relates generally to an improved data processing system and in particular to an improved method and system for visual programming within a data processing system. Specifically, the presently claimed invention is directed towards an improved method and system for visual programming to create software for use in a data processing system.

2. Description of the Related Art

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of objects. Each new object has certain data attributes and processes or methods that operate on that data. Data is said to be "encapsulated" by an object and can only be modified by the object methods, which are invoked by sending a message to an object identifying the method and supplying any needed arguments.

Object oriented systems have two important properties in addition to encapsulation. "Inheritance" is the ability to derive a new object from an existing object and inherit all properties, including methods and data structure, from the existing object. The new object may have certain unique features which are supplied as overrides or modifications to the existing class. For example, a new subclass needs to specify only the functions and data that distinguish that class from the existing more general class.

The ability to override an existing method description enables polymorphism, the ability to have a single message to an object be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks." A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system.

One object oriented programming system is the System Object Model (SOM). More information on SOM can be found in SOMobjects Developer ToolKit Users Guide, version 2.0, June 1993, available from International Business Machines Corporation.

Visual programming techniques allow users and programmers to create programming solutions to problems more quickly than programming in traditional languages such as FORTRAN, C, PASCAL, COBOL or BASIC. Visual programming environments provide a Graphic User Interface ("GUI") as an interface between the user and the data processing system. Within the GUI, visual programming may be accomplished by, for example, dragging and dropping user interface components from a pallet of components displayed to a user. The program logic is typically specified in one of three ways, by writing in a traditional programming language, by writing in a more user-friendly scripting language, such as REXX or by visually connecting components together within a visual programming environment.

The use of traditional programming or scripting languages still present users with a requirement of learning a new language. Even though scripting languages are more simple than traditional programming languages, both are still significant inhibitors for non-programmers.

Specification of program logic by visually connecting components together using a GUI is more appropriate for non-programmers. Such a visual programming environment can be more productive than coding for experienced programmers in some cases. Current implementations, however, have trouble scaling to large applications. Visual programming techniques typically used work well for a small number of connections but tend to become unusable in realistic size applications. The main cause of this scaling problem involves the specification of parameters associated with method invocations.

A method invocation, like function calls in a non-object oriented language, typically requires one or more parameters. Each parameter in turn may be supplied with yet another method invocation on the same or a different object. When the parameter resolution is itself specified by drawing visual connections in a GUI between objects, the number of connections may quickly become overwhelming with individual connections becoming indiscernible. Therefore, it would be advantageous to have a method and system to provide a visual programming technique to allow users to visually specify parameters, but in a manner that supports productive development of realistic large scale applications.

SUMMARY OF THE INVENTION

It is therefore one object of the present invention to provide an improved data processing system.

It is another object of the present invention to provide an improved method and system for visual programming within a data processing system.

It is yet another object of the present invention to provide an improved method and system for visual programming to create software for use in a data processing system.

The present invention provides a method and data processing system for efficiently creating a program in an object oriented environment using a graphic user interface. An object is graphically displayed within the graphic user interface, wherein the object includes a method written in an object-oriented language; the method has a number of parameters. Each parameter is graphically displayed in the graphic user interface. Such display may be in response to a selection of the graphically displayed object. Each parameter is visually associated with the graphically displayed object. A list of selections is displayed for a parameter in the plurality of parameters in response to a selection of the parameter. Specification of the parameter using the list of selections by the user is permitted, wherein the parameter specified using the list of selections is propagated to the method in the object oriented language used to create the object.

The object and the parameters may be graphically displayed in the graphic user interface using icons to represent the object and the parameters. The display of these icons may be in a tree structure that can be expanded or collapsed. Parameters for a method may be specified in a number of ways. For example, a parameter may be specified as a constant or some variable. A parameter may be specified using another object having a method with additional parameters. In such a situation, the second object and its parameters are displayed as a "subtree" within the tree structure. These selections or sources used to specify parameters may be displayed to a user in a pop-up menu that is displayed in the graphic user interface that contains selections allowing a user to specify the source or selection for a parameter.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
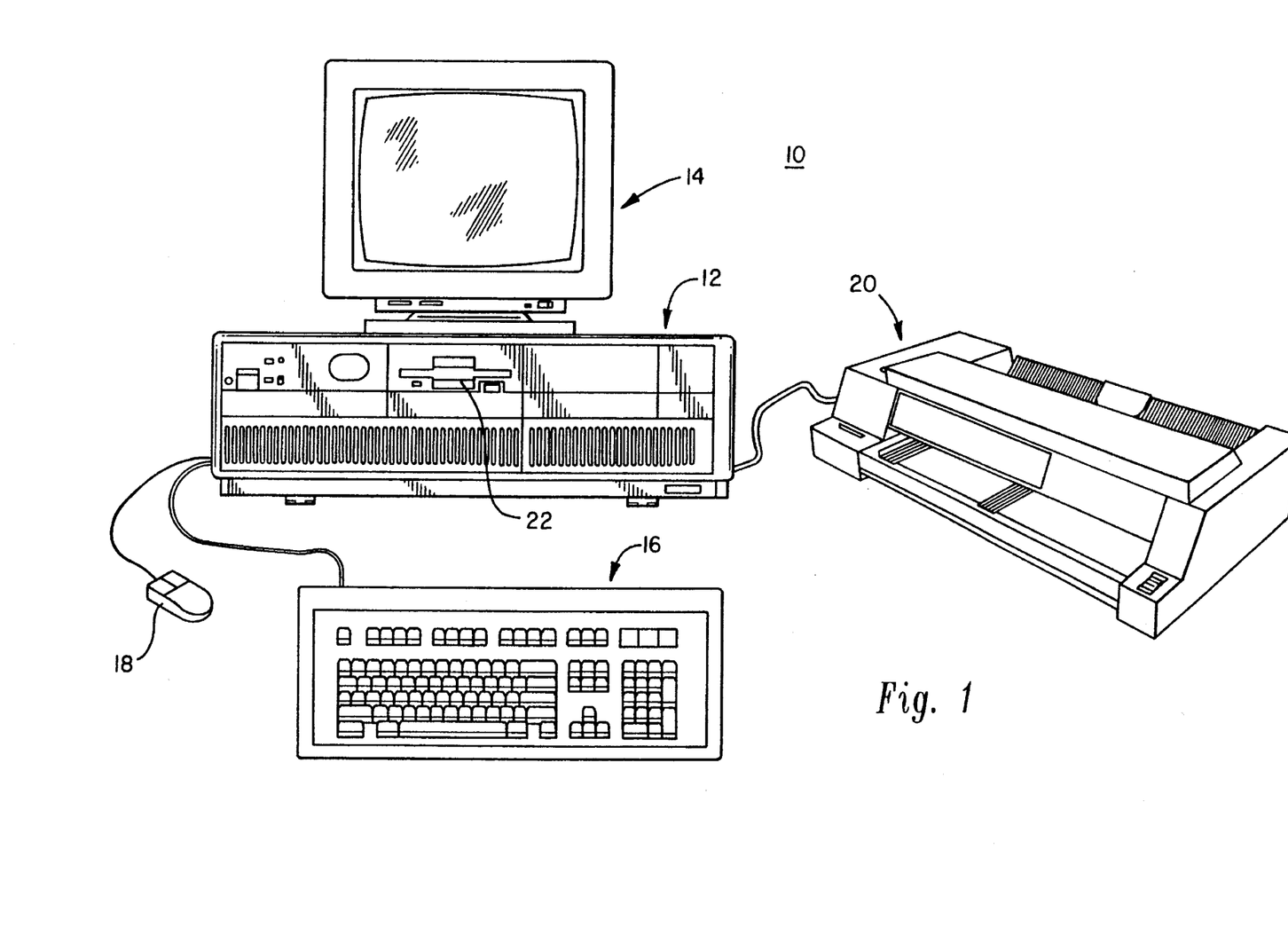
FIG. 1 depicts a data processing system in the form of a personal computer in which the present invention can be employed is depicted.

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
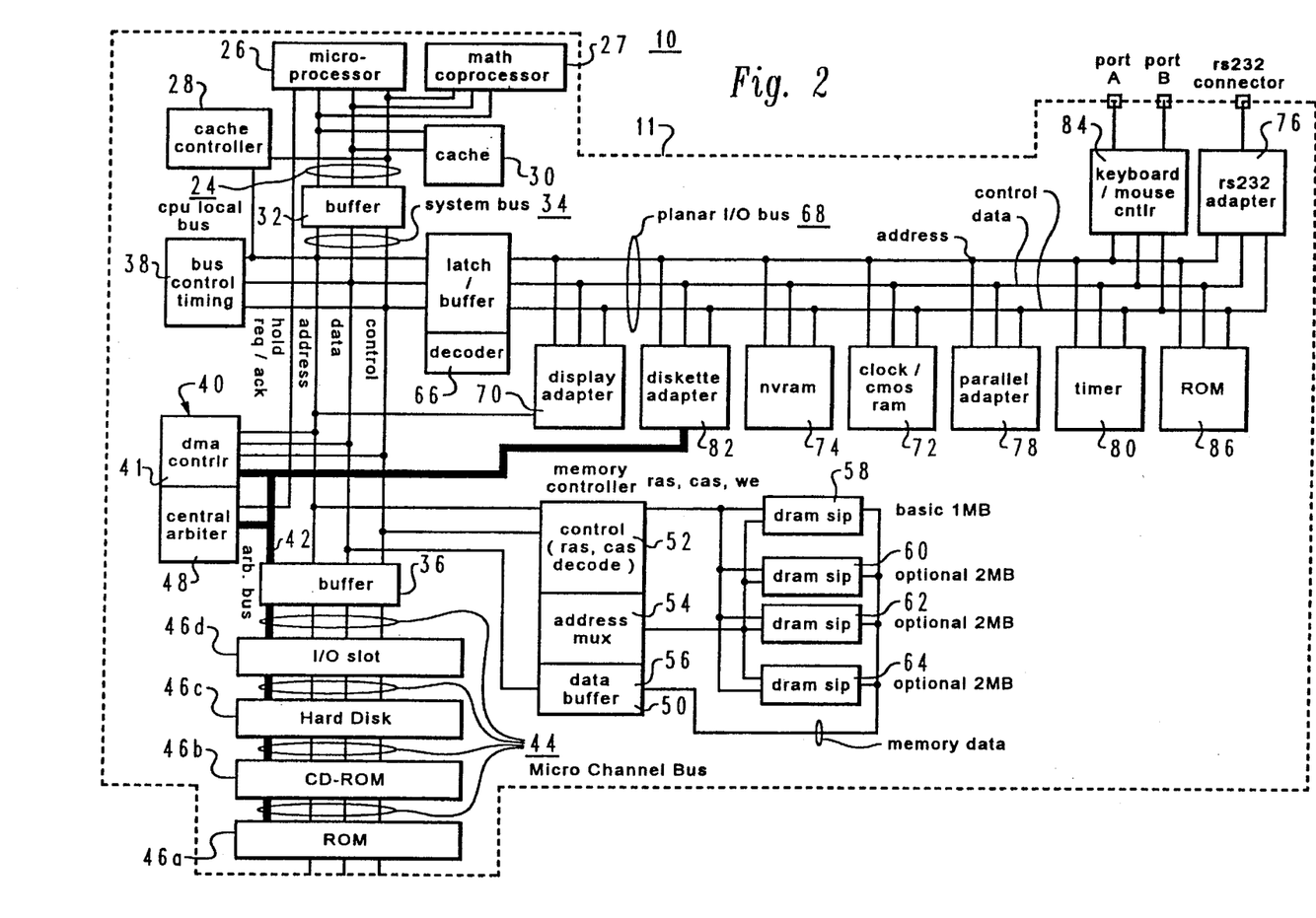
FIG. 2 is a block diagram of a personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation, "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. Other devices, such as a modem may be connected to an I/O slot. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 3:
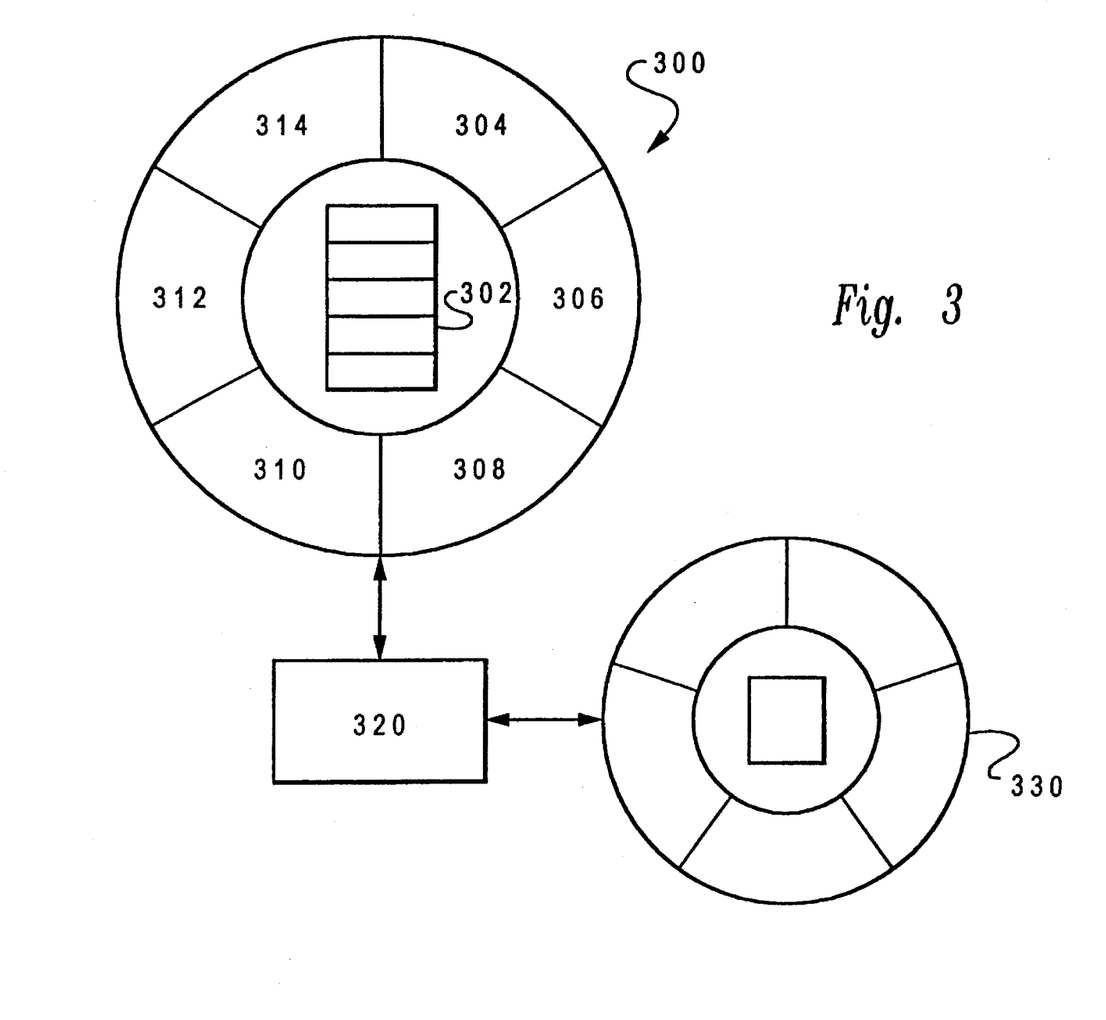
FIG. 3 depicts a diagram of objects in an object oriented system depicted in accordance with a preferred embodiment of the present invention.

With reference to FIG. 3, a diagram of objects in an object oriented system is depicted in accordance with a preferred embodiment of the present invention. An object encapsulates data and the methods needed to operate on that data. Objects can be represented by a "doughnut diagram" such as shown in FIG. 3. Object data is shown in the center 302 surrounded by the applicable methods 304 to 314. Data 302 may be modified only by the methods of that object. Methods 304–314 are invoked by receiving messages from other objects. A typical object oriented system will have a message router 320 that routes messages between objects. Thus, object 330 causes Method C 308 to be invoked by sending a message 332 to message router 320 that in turn sends message 322 to Method C 308 of object 300.

Object frameworks are constructed to provide a set of objects for application and system developers to use to construct a delivered system. The IBM System Object Model (SOM) framework, for example, provides a language independent set of objects for use in systems development.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

The present invention provides a menu-driven approach to build a tree-diagram that specifies parameters for a method invocation. The term "method" is used in object oriented programming to identify a particular function that an object can perform, such as setting its value, displaying itseft, clearing its value, etc. This term is similar to that of a function call, procedure, or subroutine in traditional programming.

Figure 4:
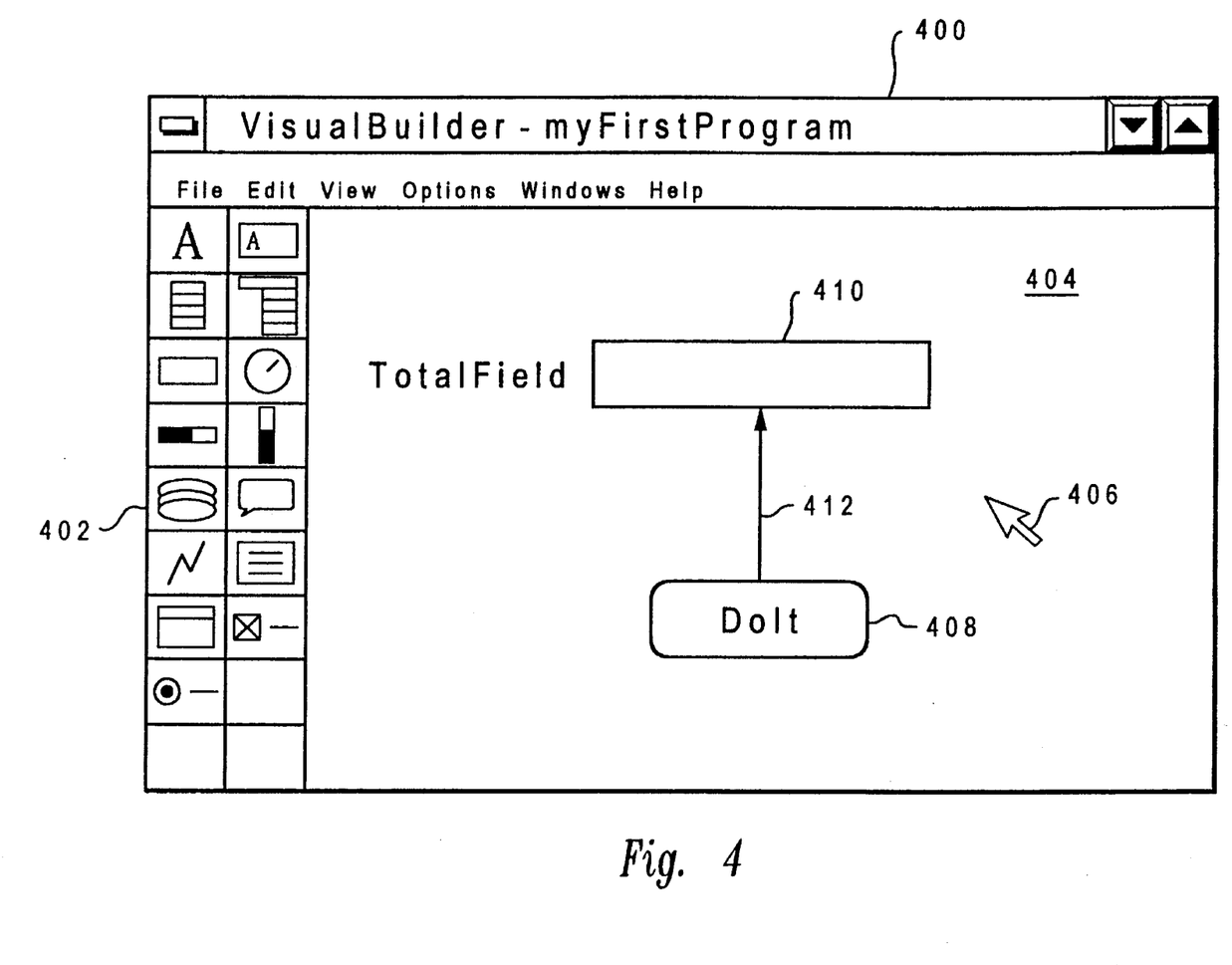
FIG. 4 depicts a visual programming window used in visual programming depicted in accordance with a preferred embodiment of the present invention.

With reference now to FIGS. 4 and 5A–5J, diagrams depicting the specifying of method parameters in a visual programming environment are illustrated in accordance with a preferred embodiment of the present invention. With reference first to FIG. 4, a visual programming window, window 400, used in visual programming is depicted in accordance with a preferred embodiment of the present invention. An example of a visual programming environment in which the present invention may be implemented is VisualAge available from International Business Machines Corporation. Another product in which the present invention may be implemented is PARTS Workbench available from Digitalk Inc., located at 9841 Airport Blvd., Los Angeles, Calif. 90045-5409, "PARTS Workbench" is a trademark of Digitalk. Within window 400, a pallet 402 is depicted containing GUI controls along the left side of window 400. These controls may include constant text, entry fields, menus, menu bars, push buttons, dials, sliders, databases, comments, links, list, dialogues, check boxes, radio buttons, and other standard user Interlace controls commonly employed in creating a program for use in a GUI. More information and more detailed description on mess vadous controls may be found in Systems Application Architecture Common User Access Guide Advance Interface Design Reference available from International Business Machines Corporation. More Information on the usage of these controls in a visual programming environment may be found in PARTS Workbench User's Guide, Digitalk Inc., July 1992.

A user may construct a program by dragging and dropping controls from pallet 402 into build area 404 using pointer 406. The term "mouse", when used in this document, refers to any type of operating system supported graphical pointing device including, but not limited to: a mouse, track ball, light pen, touch screen, and the like. A pointing device is typically employed by a user of a data processing system to interact with the data processing system's GUI. A "pointer" is an iconic image controlled by a mouse or other such device and Is displayed on the video display device of a data processing system to visually indicate to the use icons, menus, or the like that may be selected or manipulated.

The controls may be connected using links, shown as arrows In FIGS. 4 and 5A–5J, Controls are displayed to the user in a GUI that may be selected in manipulating a source or target object. Each link represents a relationship between the source object, located at the arrow's tail and the target object, located at the arrow's head. A typical relationship is event-action—that is, when the resulting program is run and some event occurs on the source object, such as a user clicks on the object using a pointing device, an action is performed by the target object, such as an entry field.

In the depicted example, a user, building a program, has dragged control 408 and 410 into build area 404. Control 408, labeled "DoIt", is the source object while control 410, labeled "TotaiField" is the target object. These two objects are connected via link 412. In particular, control 408 is a push button that is employed to trigger an action on control 410, which is an entry field in accordance with a preferred embodiment of the present invention. In the particular example illustrated in FIGS. 5A–5J, a method for specifying which event on control 408 is used to trigger which action on control 410 and the specification parameters for this action are depicted in accordance with a preferred embodiment of the present invention. After the user has created a connection between controls 408 and 410 using link 412, the user is then presented with window 414, which is a "tree window" employed to specify actions, events, and parameters in accordance with a preferred embodiment of the present invention.

Window 414 displays control icons to represent objects and parameters in accordance with a preferred embodiment of the present invention. A tree structure is employed to provide associations between the parameters and objects being displayed as icons as can be seen with reference to FIGS. 5A–5I. In the tree structure, a number of nodes, displayed as control icons, are present in which one node is the root node and the remaining nodes are partitioned into disjoint sets, called subtrees, each of which is itself a tree. Subtrees may be expanded and collapsed from nodes further up in the tree in accordance with a preferred embodiment of the present invention.

Figure 5A:
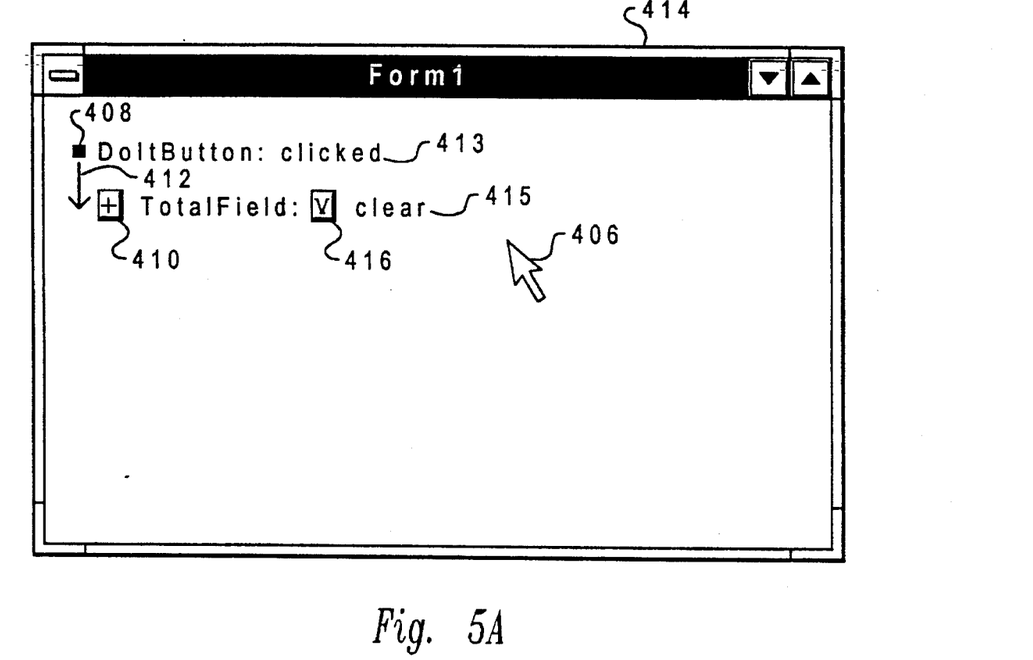
FIG. 5A–5J depict diagrams of tree structures employed to provide associates between the parameters and objects being displayed as icons.

As can be seen with reference to FIG. 5A, control icon 408 (DoItButton), control icon 410 (TotalField), and link 412 are displayed within window 414. In addition, control icon 410 includes a second icon, control icon 416 associated with it. In the depicted example, window 414 appears on top of and overlaps window 400 (not shown) in which the connection was made in FIG. 4. Initially, window 414 indicates the name of control icon 408 DoItButton, the name of the default event 413 associated with control icon 408, "clicked" in FIG. 5A, for which an action is to be defined. In addition, window 414 includes the name of control icon 410, TotalField, which will perform the desired action and the name of the default action 415 "clear" associated with control icon 416.

Also shown in window 414 is link 412, connects control icons 408 and 410 to indicate the relationship between the source object and the target object. In accordance with a preferred embodiment of the present invention, links are employed to reinforce the relationship between two object represented by control icons for the benefit of the user and are not necessary for use according to the present invention.

Figure 5B:
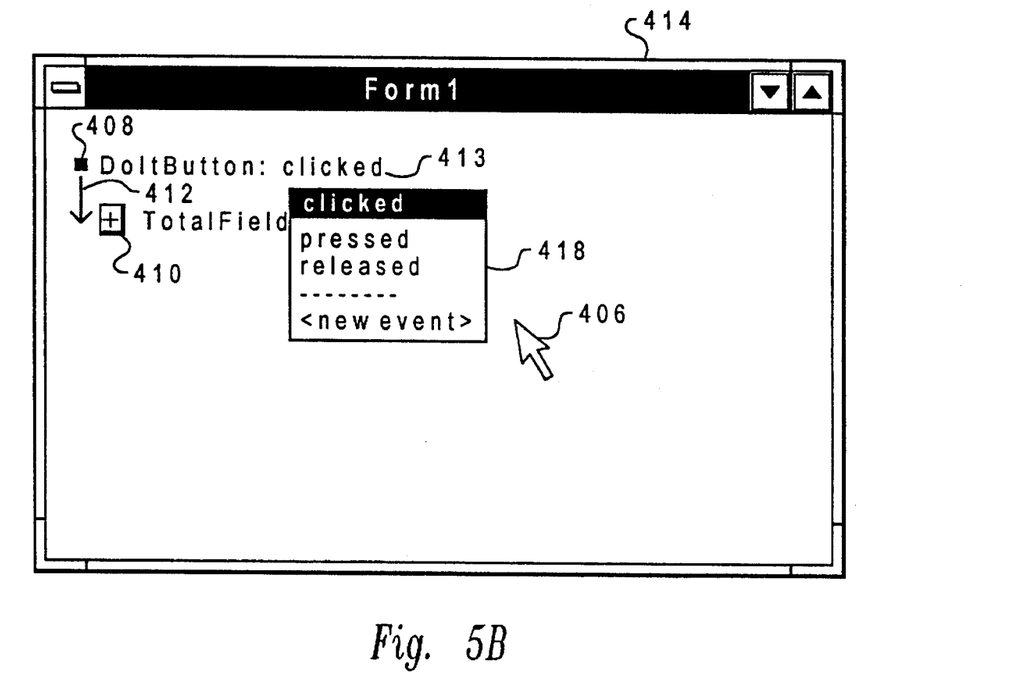

Referring now to FIG. 5B, the user has selected a default event 413 using pointer 406, indicating a desire to change the event for which an action is being defined. Pop-up menu 418 is displayed to the user listing possible events to which the source object, represented by control icon 408, can react is presented. Pop-up menu 418 includes the choices: "clicked", "pressed", "released", and "<new event>". A user may chose an event from pop-up menu 418, such as "pressed", which is shown in FIG. 5B.

Figure 5C:
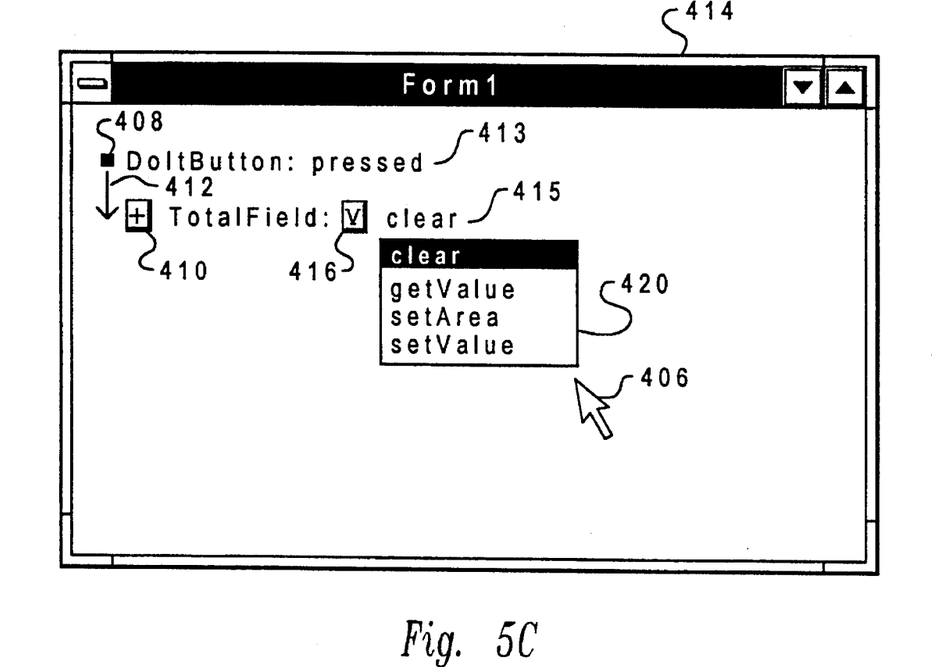

Next, with reference to FIG. 5C, the user has selected default method 415, associated with the target object, causing pop-up menu 420 to be displayed to the user. Pop-up menu 420 includes a list of alternative actions for the object TotalField, such as clear, getValue, setArea, and setValue. At this point, the user decides to investigate events that can be triggered on the object TotalField instead of selecting a particular action. In other words, one action a user can request of an object is to simulate that a particular event has occurred on that object.

Figure 5D:
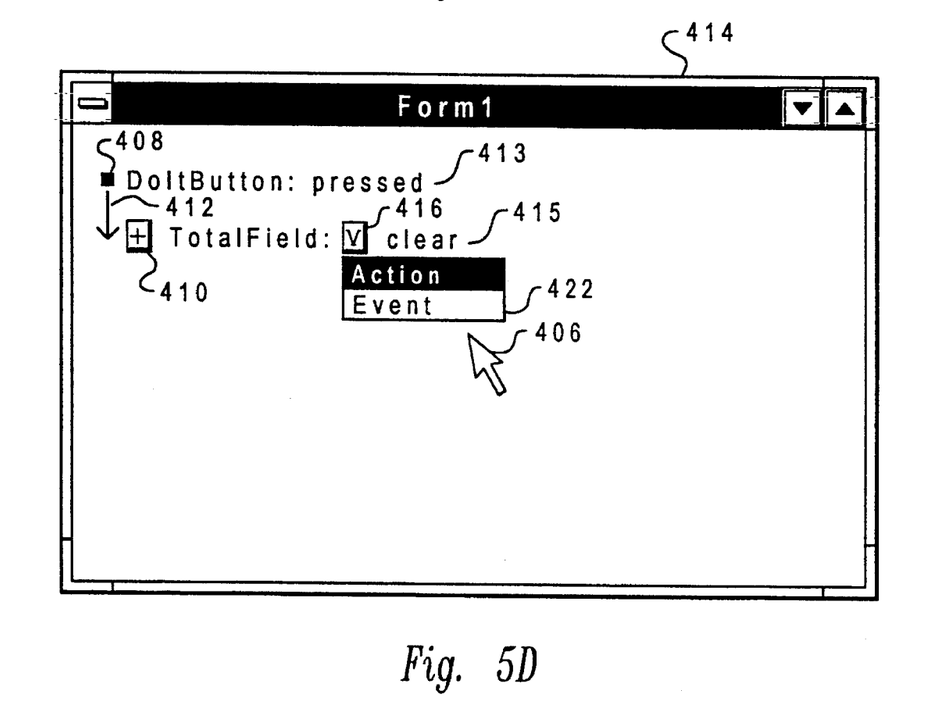
Figure 5E:
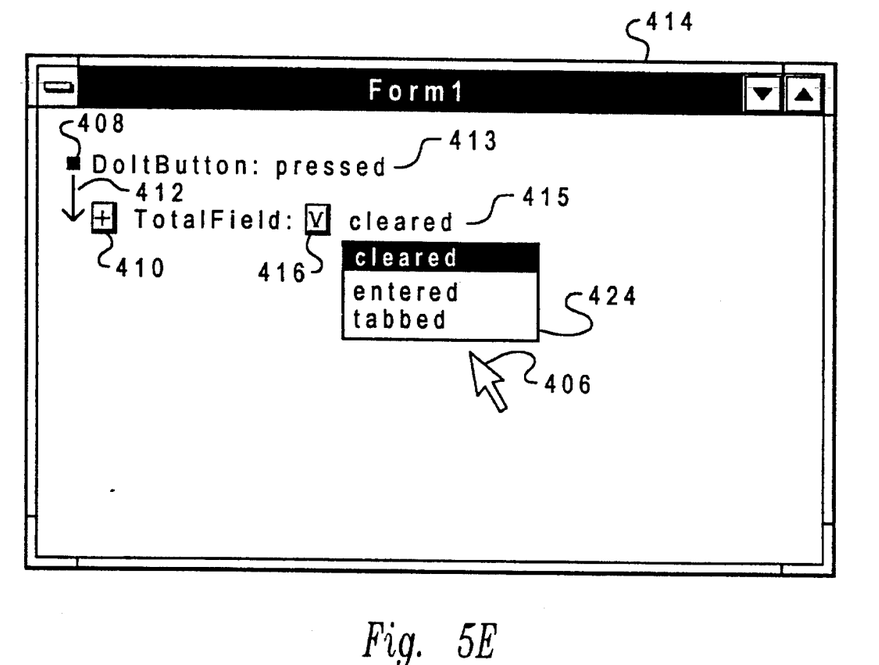

With reference to FIG. 5D, the user has selected control icon 416, which results in pop-up menu 422 being displayed to the user. This pop-up menu allows the user to request that the following list be either a list of actions the target object can perform pop-up menu 420 or a list of events to which the target object can respond pop-up menu 424 depicted in FIG. 5. The user, in FIG. 5E, has selected the event choice in pop-up menu 422 from FIG. 5D, resulting in pop-up menu 424, displaying a list of events to which the object Total Field can respond. This list includes the events cleared, entered, and tabbed.

Figure 5F:
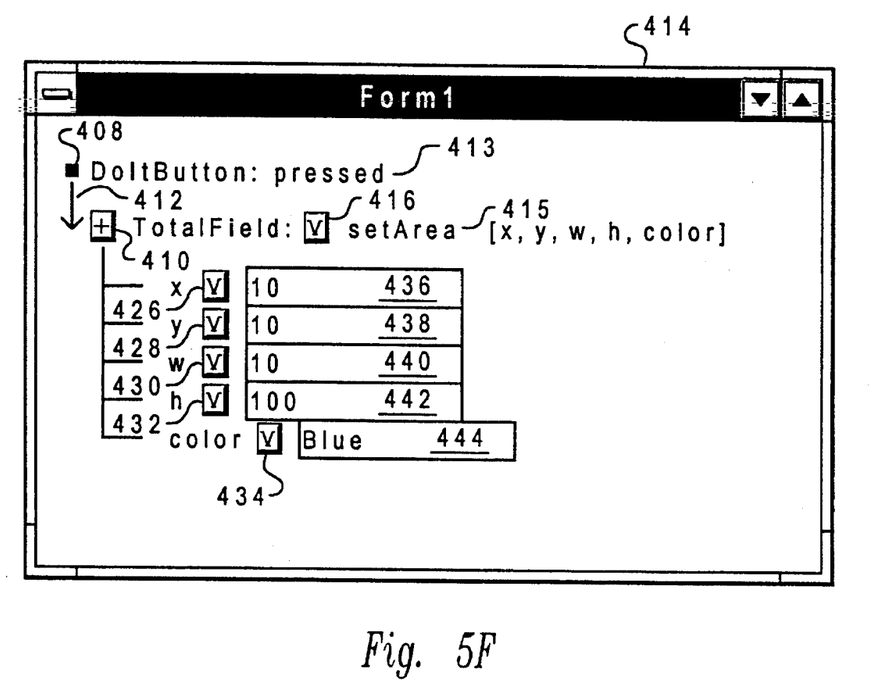

Referring now to FIG. 5F, the user has chosen to not use an event, but instead has gone back and selected the choice action from pop-up menu 422. This selection results in pop-up menu 420 (not shown) from FIG. 5C being displayed; the action setArea was selected resulting in the name setArea being displayed in default method 415 in FIG. 5F. In addition, a listing of parameters required for the setArea action are displayed along with control icons 426, 428, 430, 432, and 434. Control icon 426 is associated with the parameter x, control icon 428 is associated with the parameter y, control icon 430 is associated with the parameter w, control icon 432 is associated with the parameter h, and control 434 is associated with the color for the setArea action. In addition, entry fields 436, 438, 440, 442, and 444 are displayed. In the depicted example, the required parameters include a location (x and y) size (w and h), and color.

Each of these parameters may be supplied in a number of ways by the user including (1) entering a specific value, such as the constant "10" displayed with entry field 436; (2) specifying the name of a function or subroutine that will return a specific value; (3) the user specifying the name of an object that provides an action that returns a specific value; or (4) specifying a user-written script that returns a specific value. In the depicted example in FIG. 5F, the default value for each parameter is shown as being a constant.

It should be understood that a variety of alternatives may be employed to return a specific value.

Figure 5G:
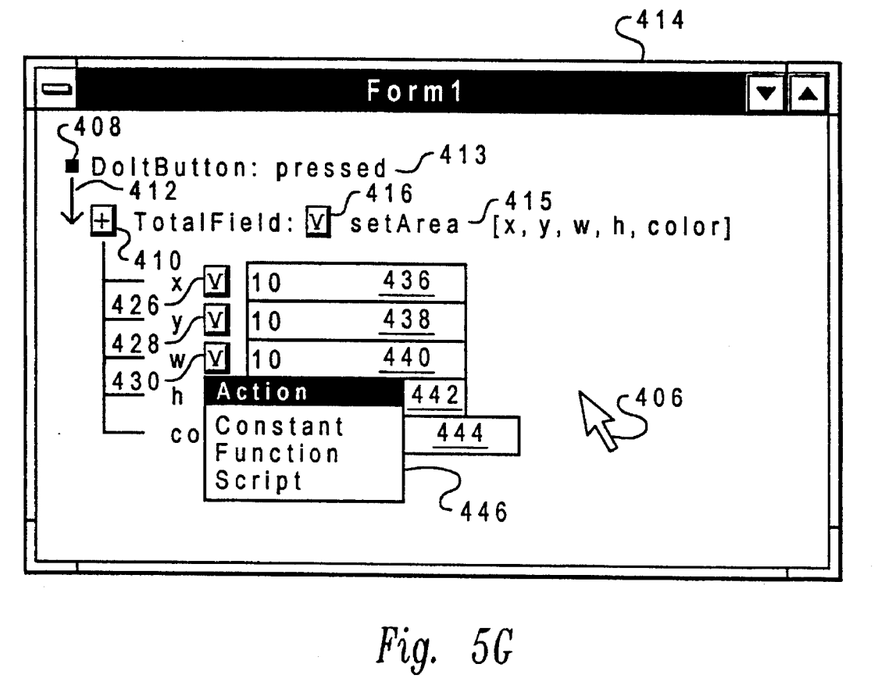

Referring now to FIG. 5G, the user has decided to specify the width parameter w associated with control icon 430 by employing another object to specify this parameter. The user has selected control icon 430, which results in pop-up menu 446 being displayed to the user. This pop-up menu displays alternative methods for specifying the parameter for w in accordance with a preferred embodiment of the present invention.

Figure 5H:
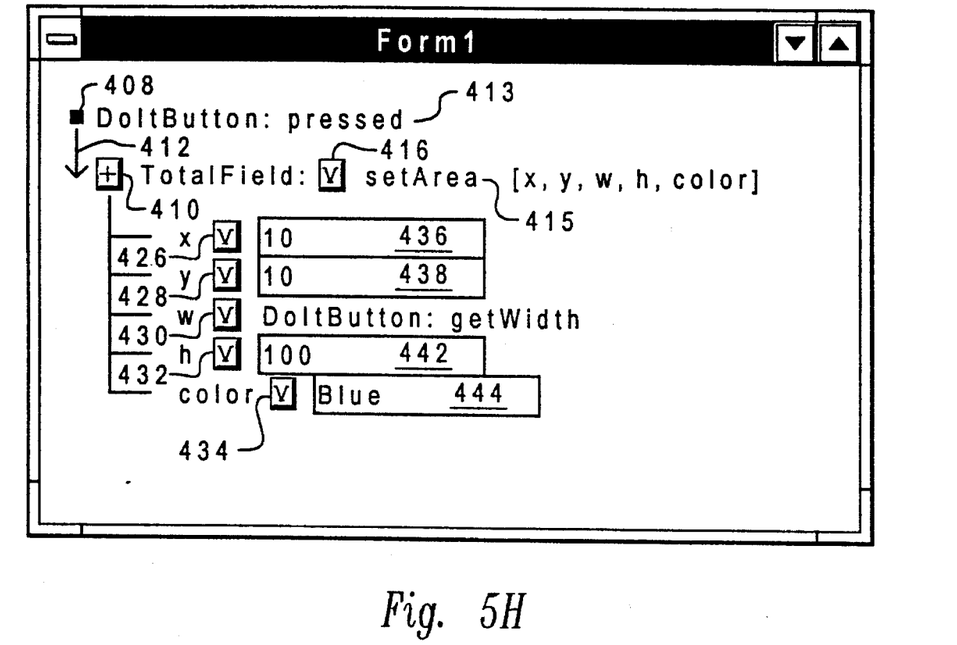
Figure 5I:
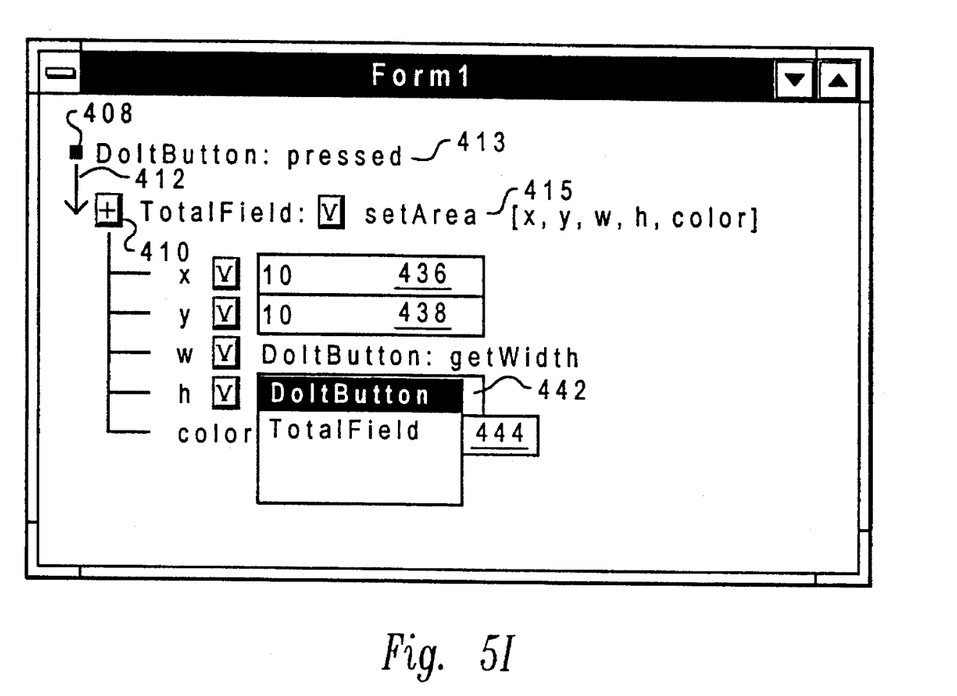

Referring next to FIG. 5H, the user has chosen action from action pop-up menu 446 and the constant "10" within entry field 440 has been replaced with a default object name and a default action name from that object. Each of these names are elements of a pop-up list which is exposed if the user clicks on the name. In accordance with a preferred embodiment of the present invention, a list of alternative objects and actions may be displayed such that only objects and actions that return a value appropriate for the width parameter w are included in the list of alternatives. With respect to FIG. 5I, the defaults have been. established as the DoIt button object and the GetWidth action. In FIG. 5I, pop-up menu 440 is displayed including DoIt button as a choice. In pop-up menu 440 only the names of two objects appear because only two objects have been defined as of yet in the visual programming system in window 400.

Given no further changes by the user, the resulting runtime action has been defined as follows:

when the DoIt button is pressed the area of the TotalField will be set so that its x and y values will be both "10", its width will be set equal to that of the DoIt button, its height set to "100", and its color will be set to "blue".

The over all effect is such that if the width of the DoIt button varied from time to time, each time the button was pressed the TotalField would become the same width as the button. As a result, the user has created a "program" without resorting to any traditional language oriented programming approaches.

Figure 5J:
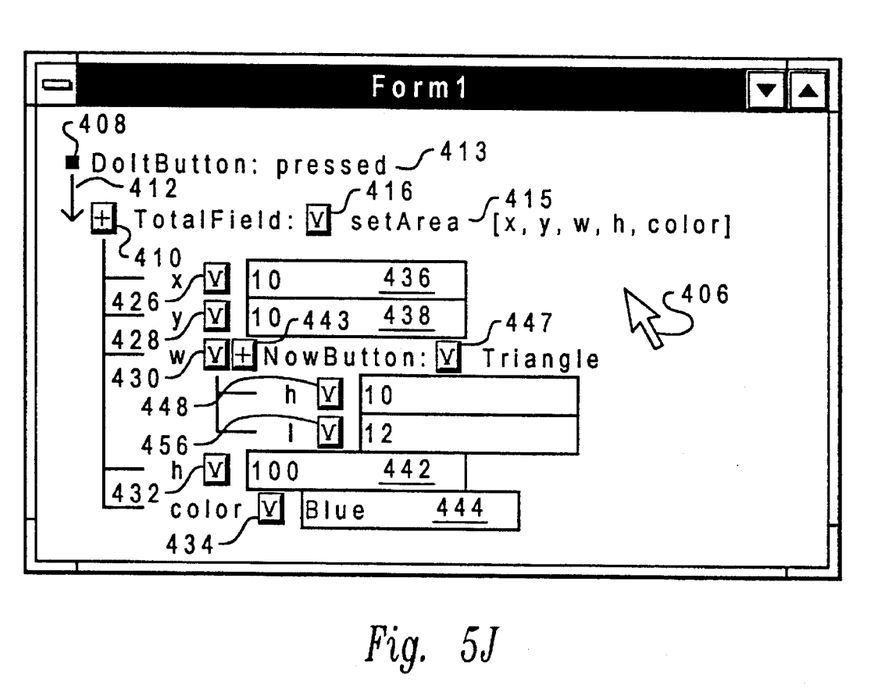

Referring next to FIG. 5J, control 443 is associated with NowButton. This figure depicts the recursive nature of the present invention, which allows for subtrees. The NowButton object includes control 446, which is associated with the action called triangle. This action has two parameters, h and l associated with it. Controls 448 and 450 are displayed in association with these parameters and connected to control 443.

Figure 6A:
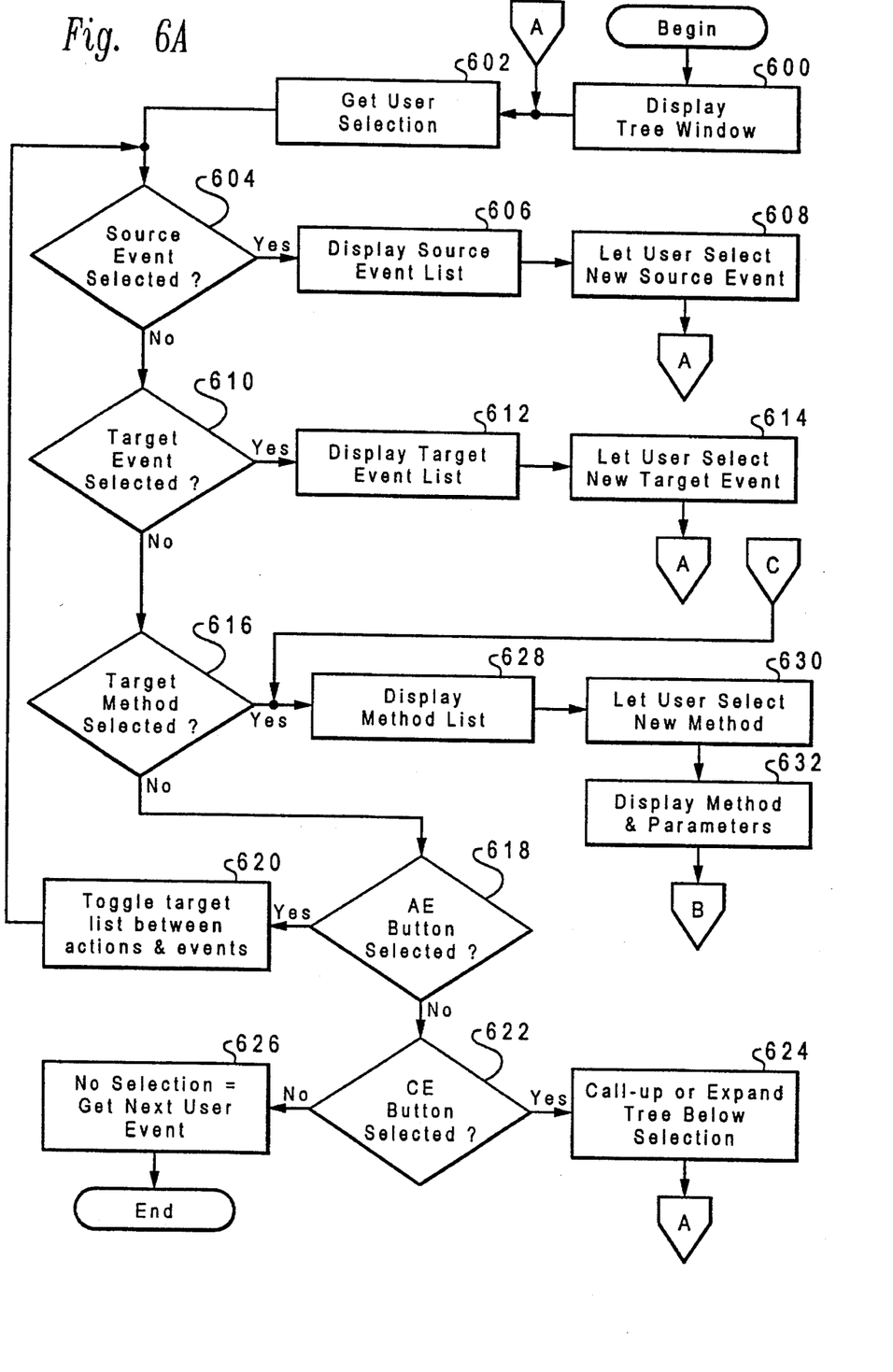
FIGS. 6A–6B depict a flowchart of processing for specifying method parameters in a visual programming environment.
Figure 6B:
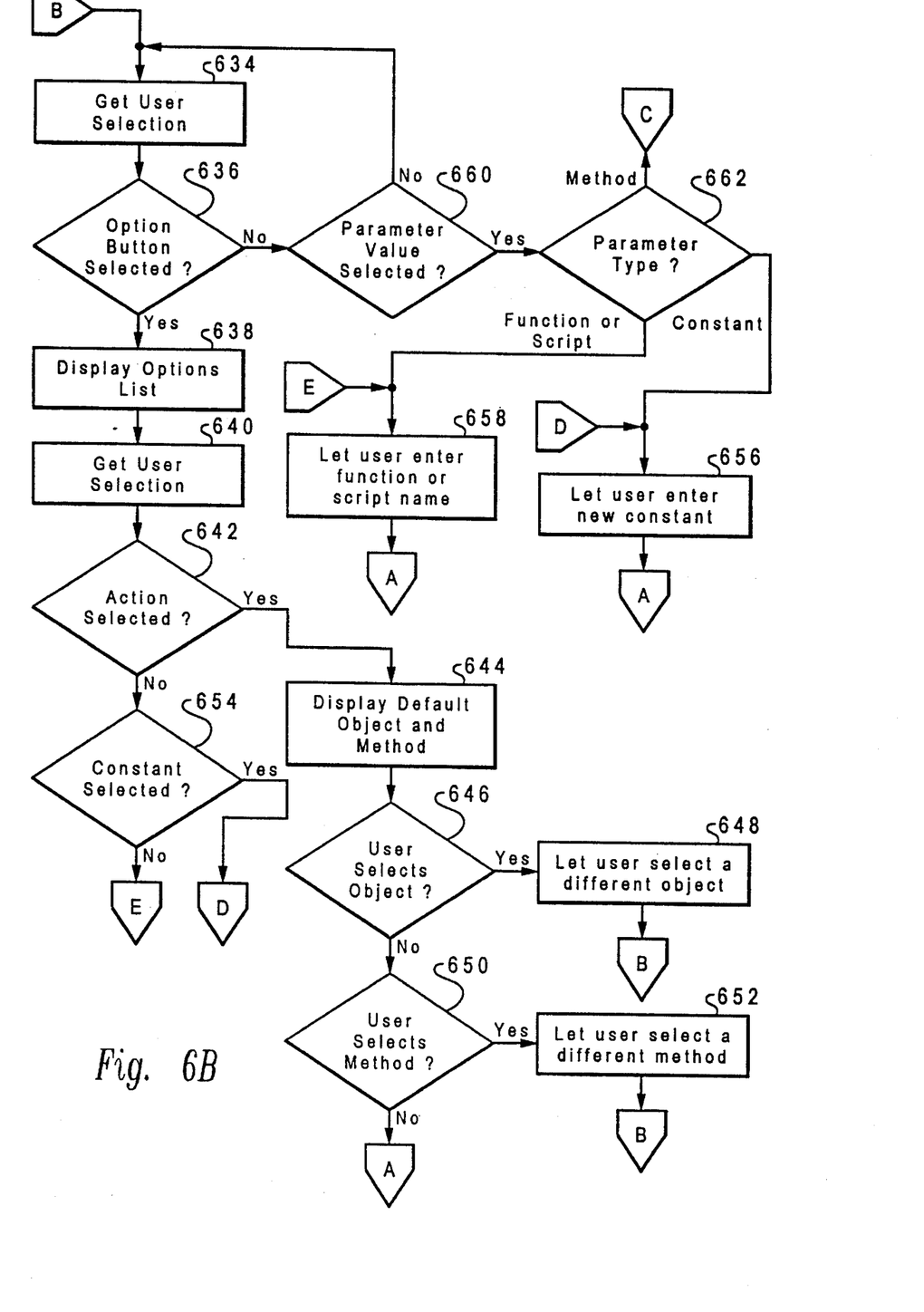

With reference now to FIGS. 6A and 6B, a flowchart of processing for specifying method parameters in a visual programming environment is depicted in accordance with a preferred embodiment of the present invention. The process begins by displaying a tree window to the user for specifying method parameters (step 600). Thereafter, the process obtains the user selection (step 602). The process then determines whether a source event has been selected (step 604). If a source event has been selected, a source event list is displayed (step 606). Then, the process allows the user to select a new source event (step 608). With the process thereafter returning to step 602 to obtain another user selection.

Referring back to step 604, if a source event has not been selected, the process then determines whether a target event has been selected (step 610). If a target event has been selected by the user, a list of target events is displayed to the user (step 612). The process then allows the user to select a new target event (step 614). With the process then returning to step 602 for additional user selections.

Referring again to step 610, if a target event has not been selected, the process then determines whether a target method has been selected (step 616). If a target method has not been selected, a determination of whether an action/event (AE) button has been selected (step 618). If an action/event button has been selected the process then toggles the target list between actions and events (step 620). The process then returns to step 604. Referring again to step 618, if an action/event button has not been selected, the process then proceeds to determine whether a collapse/expand (CE) button has been selected (step 622). If the CE button has been selected, the process either collapses or expands the tree below the selection (step 624) with the process then returning to 602 to obtain a user selection. Referring again to step 622, if a CE button has not been selected, then the process indicates that no selection has been made and obtains the next user event (step 626) with the process terminating thereafter.

Referring again to step 616, if a target method has been selected, the process then displays a method list (step 628). Thereafter, the process allows the user to select a new method (step 630) and displays the method and parameters associated with the new method selected by the user (step 632). The process then obtains the user selection associated with the method and parameters displayed (step 634). A determination of whether the option button has been selected is made (step 636). If the option button has been selected, a list of options is displayed to the user (step 638). The process then obtains the user selection from this list of options (step 640).

Thereafter, the process determines whether the option "action" was selected (step 642). If the answer to this determination is yes, the process then displays the default object and method (step 644). Next, the process determines whether the user has selected the default object (step 646). If the user has selected the default object, the process then allows the user to select a different object (step 648) with the process then returning to step 634 to obtain another user selection. If the user has not selected the default object, the process then determines whether the default method has been selected (step 650). If the user has selected the default method, the process then allows the user to select a different method (step 652) with the process then returning to step 634 to obtain another user selection.

Referring again to step 642, if the user has not selected the action option, the process then determines whether the user has selected the constant option (step 654). If the user has selected the constant option, the process then allows the user enter a new constant (step 656) with the process then returning to step 602. Referring again to step 654, if the user has not selected the constant option, the process assumes the script option has been selected and allows the user to enter a function or script name (step 658) with the process thereafter returning to step 602.

With reference again to step 636, if the option icon has not been selected by the user, the process then determines whether a parameter value has been selected. If a parameter value has not been selected, the process returns to step 634 to obtain a user selection. Otherwise, the process determines the parameter type selected by the user (step 662). The user may select method, constant, or function or script as a parameter type. If constant is the parameter type selected, the process allows the user to enter a new constant (step 656) and then returns to step 602. The selection of a function or script as the parameter type results in the process allowing the user to enter a function or script name (step 658) with the process then returning to step 602. The selection of a method as a parameter type results in the process returning to step 628 to display a list of methods as described previously.

Pseudo code for specifying method parameters in a visual programming system is illustrated in the Appendix. The processes depicted in FIGS. 4, 5A–5J, and 6A–6B may be implemented by those of ordinary skill in the art within the data processing system depicted in FIGS. 1 and 2. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

While the invention has been particularly shown and described with reference to a preferred embodiment, it will be understood by those skilled in the art that various changes in form and detail may be made therein without departing from the spirit and scope of the invention.

APPENDIX

```
treeWindow =CreateWindow(size,location,title)            'creates the window"Form1"in Fig1
with treeWindow do
    setDrawPoint(sourceNameStart)                         'set to begin drawing source object name
    sourceObject.draw Name                                'displays the text 'DoItButton:"
    sourceObject drawDefaultEvent                         'displays the default event int he list("clicked")
    setDraw Point(nextLine)                               'move to next line
    firstECButton=Create ExpandButton(currentPos)         'create and draw the first expand/collapse button
    targetObject drawName                                 'displays the text"TotalField:"
    firstAEButoon-CreateAEButton(currentPos)              'displays the first Action/Event button
    targetObject drawDefaultMethod                        'displays the default method in the list ("clear")
    drawLink(sourceNameStart,firstECButton)               'draw line representing link
    getEvents                                             'begin handling user events
    (user event handling for source and target objects-DoIt and TotalField in Fig 1)
case Selection of
    defaultEvent                                          'user selected default event, clicked in Fig 1
        elist=sourceObject createEventList                'get list of other events from source object
        elist display                                     'display the list (Figure 2)
        elist getUserSelection                            'let the user select a choice from the list
        if userSelection ='<new event>'then               'if the user wants to define a new event
            CreateNewEvent                                'invoke a routine to define a new event
        else                                              'otherwise
            defaultEvent=userSelection                    'make the selected event the new default
                                                          '(pressed in Figure 3)
    defaultMethod                                         'user selected default method, clear in Fig 3
        mlist=targetObjectcreateMethodList                'get list of other methods from target object
        mlist.display                                     'display the list (Figure 3)
        mlist.getUserSelection                            'let the user select a choice from the list
        defaultMethod=userSelection                       'make the selected method the new default
                                                          '(setArea in Figure 6)
        defaultMethod.displayParmList                     'display parameter list for this method
        (x,y,w,h,color)
        for I:=1 to defaultMethod.numParms                'for each parameter
            setDrawPoint(nextLine)                        'move to the next line
            parmName[i].display                           'display the parameter name (e.g.,x)
            optionsButton,display                         'display the options button
            parmValue[i].display                          'display the parameter value (e.g.,'10' for x)
        AEButton:                                         'user selected the action/event button (Fig 4)
            aeList.display                                'display the list
        aeList.getUserSelection                           'let the user select a choice from the list
            if userSelection='Action'then                 'if the user wants target object actions
                setDrawPoint(AEButton+1)                  'set to draw following the AEButton
                methodDefault.display                     'display the name of the default method
                                                          '(clear in Fig 4)
            else                                          'otherwise
                setDrawPoint(AEButton+1)                  'set to draw following the AEButton
                eventDefault display                      'display the name of the default event
                                                          '(cleared in Fig 5)
        optionsButton:                                    'user selected an options button (Fig 7)
            optionsList.display                           'display the list(Action, Constant,...)
            optionsList.getUserSelection                  'let the user select how the parameter is supplied
            case userSelection of                         'handle the user's selection
            Action:                                       'the user wants to use a method on an object
                oList=builder.CreateObjectList            'get a list of all object in the builder
```

APPENDIX-continued

| | |
|---|---|
| oList.displayDefaultObject | 'display the default object's name (DoItButton in Fig 8) |
| oList.displayDefaultMethod | 'display the default method for the object |
| (getWidth) | |
| | 'recursion occurs if this method has parameters |
| Constant: | 'the user wants to use a constant value |
| defaultValue.display | 'display a default value in an entry field ('10) |
| defaultValue=getUserEntry | 'let the user change it |
| Function | 'the user wants to identify a function name |
| (display a list of available functions or let the user enter the name of one) | |
| Script: | 'the user wants to enter a script |
| (display a list of available script names, let the user enter a name or create a script) | |
| (other cases): | |
| defaultObject: | 'the user selected a default object name (Fig 9) |
| oList.displayList | 'display the list of available objects |
| oList.getUserSelection | 'let user select a different object |
| defaultObject=userSelection | 'make the default object the user's selection |
| defaultObject.display | 'display the new default object |
| defaultMethod.display | 'display the default object's default method |
| | 'continue user event handling |
| ECButton | 'user selected an Expand/Collapse button (Fig |
| if expanded then | 'if already expanded the collapse |
| (remove from the display all information below the expand/collapse button) | |
| else | 'otherwise, expand it |
| (display all the information below the expand/collapse button) | |
| (the above expand/collapse function is well-known in the industry) | |

What is claimed is:

1. A method in a data processing system for efficiently creating a program in an object oriented environment using a graphic user interface, said method comprising:

graphically displaying an object, wherein said object includes a method written in an object-oriented language, said method having a plurality of parameters;

graphically displaying each parameter within said plurality of parameters in response to a selection of said graphically displayed object, wherein each parameter is visually associated with said graphically displayed object;

displaying a list of selections for a parameter in said plurality of parameters in response to a selection of an icon displayed for a parameter; and permitting specification of said parameter using said list of selections, wherein said parameter is specified using said list of selections is propagated to said method in said language for said object.

2. The method of claim 1, wherein said step of graphically displaying an object comprises displaying an icon within said graphic user interface to represent said object.

3. The method of claim 2, wherein said step of graphically displaying each parameter comprises displaying an icon for each parameter within said plurality of parameters, wherein each icon represents one of said plurality of parameters.

4. The method of claim 3, wherein said step of graphically displaying each parameter further comprises displaying each icon for said plurality of parameters in a tree structure, wherein each icon in said tree structure has a graphic connection to said icon representing said object.

5. The method of claim 4, wherein said step of displaying a list of selections for a parameter comprises displaying a pop-up menu within said graphic user interface, wherein said pop-up menu displays said list of selections for selection by a user.

6. The method of claim 4, wherein said step of displaying a list of selections for a parameter comprises displaying a name of an object as a selection for said parameter within said list of selections.

7. The method of claim 4, wherein said step of displaying a list of selections for a parameter comprises displaying a variable as a selection for said parameter within said list of selections.

8. The method of claim 4, wherein said step of displaying a list of selections for a parameter comprises displaying a constant as a selection for said parameter within said list of selections, wherein selection of said constant by a user allows said user to enter a number for said parameter.

9. A data processing system for efficiently creating a program in an object oriented environment using a graphic user interface, said data processing system comprising:

first display means for graphically displaying an object, wherein said object includes a method written in an object-oriented language, said method having a plurality of parameters;

second display means for graphically displaying each parameter within said plurality of parameters in response to a selection of said graphically displayed object, wherein each parameter is visually associated with said graphically displayed object;

third display means for displaying a list of selections for a parameter in said plurality of parameters in response to a selection of an icon displayed for a parameter; and means for permitting specification of said parameter using said list of selections, wherein said parameter is specified using said list of selections is propagated to said method in said language for said object.

10. The method of claim 9, wherein said first display means comprises means for displaying an icon within said graphic user interface to represent said object.

11. The method of claim 10, wherein said second displayed means comprises means for displaying an icon for each parameter within said plurality of parameters, wherein each icon represents one of said plurality of parameters.

12. The method of claim 11, wherein said third display means further comprises means for displaying each icon for said plurality of parameters in a tree structure, wherein each icon in said tree structure has a graphic connection to said icon representing said object.

13. The method of claim 12, wherein said third display means parameter comprises means for displaying a pop-up menu within said graphic user interface, wherein said pop-up menu displays said list of selection for selection by a user.

14. The method of claim 12, wherein said third display means comprises means for displaying a name of an object as a selection for said parameter within said list of selections.

15. The method of claim 12, wherein said third display means comprises means for displaying variable as a selection for said parameter within said list of selections.

16. The method of claim 12, wherein said third display means comprises means for displaying a constant as a selection for said parameter within said list of selections, wherein selection of said constant by a user allows said user to enter a number for said parameter.

17. A method in a data processing system for efficiently creating a program in an object oriented environment using a graphic user interface, said method comprising:

graphically displaying a plurality of objects, wherein said at least one object includes a method having a plurality of parameters;

selectively displaying each parameter in said plurality of parameters for said at least one object in association with said at least one object, wherein said plurality of parameters are displayed using a tree structure;

displaying a list of sources for a parameter within said plurality of parameters in response to a selection of said parameter; and permitting specification of said parameter using said list of sources, wherein said parameter specified using said list of parameters is propagated to said method in said language for said object.

18. The method of claim 17, wherein said step of graphically displaying a plurality of object comprises displaying an icon within said graphic user interface to represent each object.

19. The method of claim 18, wherein said step of selected displaying each parameter comprises displaying an icon within said tree structure for each parameter within said plurality of parameters, wherein each icon represents one of said plurality of parameters.

20. The method of claim 19, wherein said step of displaying a list of sources for a parameter comprises displaying a pop-up menu within said graphic user interface, wherein said pop-up menu displays said list of sources for selection by a user.

21. A data processing system for efficiently creating a program in an object oriented environment using a graphic user interface, said method comprising:

first display means for graphically displaying a plurality of objects, wherein said at least one object includes a method having a plurality of parameters;

second display means for selectively displaying each parameter in said plurality of parameters for said at least one object in association with said at least one object, wherein said plurality of parameters are displayed using a tree structure;

third display means for displaying a list of sources for a parameter within said plurality of parameters in response to a selection of said parameter; and specification means for permitting specification of said parameter using said list of sources, wherein said parameter specified using said list of parameters is propagated to said method in said language for said object.

22. A storage device readable by a data processing system and encoding data processing system executable instructions for the data storage device comprising:

means for graphically displaying a plurality of objects, wherein said at least one object includes a method having a plurality of parameters;

means for selectively displaying each parameter in said plurality of parameters for said at least one object in association with said at least one object, wherein said plurality of parameters are displayed using a tree structure;

means for displaying a list of sources for a parameter within said plurality of parameters in response to a selection of said parameter; and means for permitting specification of said parameter using said list of sources, wherein said parameter specified using said list of parameters is propagated to said method in said language for said object, wherein said means are activated when said storage device is connected to and accessed by a data processing system.

23. The storage device of claim 22, wherein said storage device is a hard disk drive.

24. The storage device of claim 22, wherein said storage device is a ROM for use with said data processing system.

25. The storage device of claim 22, wherein said storage device is a floppy diskette.

* * * * *